United States Patent Office 2,835,697
Patented May 20, 1958

2,835,697
SALICYLIC ACID β-CYCLOPENTYLPROPIONATE

Maxton F. Murray, Kalamazoo Township, Kalamazoo County, Mich., assignor to The Upjohn Company, Kalamazoo, Mich., a corporation of Michigan No Drawing. Application May 10, 1956
Serial No. 583,940

1 Claim. (Cl. 260—468)

The present invention is concerned with a physiologically active organic compound related to salicylic acid and is more particularly concerned with salicylic acid β-cyclopentylpropionate, the structural formula being as follows:

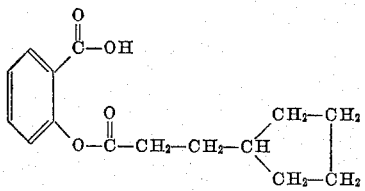

Aspirin or acetylsalicylic acid is known to be one of the best analgesics available; however, it is readily hydrolyzed and does not maintain its analgesic effect for any prolonged period of time. While many esters of salicylic acid have been made by esterifying the carboxylic acid group of salicylic acid with various alcohols, the esters obtained have either lacked adequate analgesic activity or the desired long-acting effect or both, or have been otherwise unsuitable, for example, because of a vile taste, for therapeutic use.

It has now been found that the disadvantages of the prior art are avoided by the aforesaid ester of salicylic acid and β-cyclopentylpropionic acid, as may be obtained, for example, by esterifying salicylic acid with a β-cyclopentylpropionyl halide or with β-cyclopentylpropionic anhydride, and provides a physiologically active agent having high and prolonged analgesic and antipyretic effects. The compound of this invention, salicylic acid β-cyclopentylpropionate, gives a more prolonged action and causes less gastric distress than acetylsalicyclic acid, is stable in pharmaceutical formulations, including aqueous formulations, and can be substituted for acetylsalicylic acid in pharmaceutical compositions such as tablets, capsules, elixirs, non-aqueous suspensions and in addition can be formulated in aqueous vehicles. The compound of this invention, due to its very low solubility and its high resistance to hydrolysis, especially at a pH of 2–4, is particularly suitable for use in aqueous suspensions for administration to children and others who have difficulties in taking tablets. Other uses and advantages of the present invention will be apparent to one skilled in the art.

The salicylic acid β-cyclopentylpropionate of the present invention is obtained by esterification of salicylic acid to introduce the β-cyclopentylpropionyl radical, as more fully illustrated by the example below. The esterification advantageously is carried out with β-cyclopentylpropionyl chloride or bromide in the presence of an acid-binding agent, such as a tertiary amine, e. g. pyridine, dimethylaniline, collidine, triethylamine, etc. The esterification alternatively can be carried out with β-cyclopentylpropionic anhydride; no acid binding agent will be necessary with this reagent. Other esterification methods, such as transesterification, can also be used. Equimolar quantities of the reactants and of the acid-binding agent are preferred; however, an excess of one reactant or of the acid-binding agent can be used if desired. The reaction is advantageously carried out under substantially anhydrous conditions and in the presence of an inert medium or solvent such as diethyl ether, diisopropylether, methylene chloride, chloroform, ethylene dichloride and dioxane. While the optimum reaction temperature is about zero to about thirty degrees centigrade when anhydrous diethyl ether is used as solvent, any lower reactive temperature can be used. Also higher temperatures of up to about 75 degrees centigrade can be used, particularly when other solvents are employed. Ordinarily, the maximum temperature is governed by the boiling point of the solvent at atmospheric pressure, but a higher maximum for a given solvent can be obtained, if desired, by the use of superatmospheric pressure. The preferred reaction temperature is about zero to about fifty degrees centigrade.

The following example is illustrative only and is not to be construed as limiting the scope of the present invention.

*Example.—Salicylic acid β-cyclopentylproprionate*

A solution of 32.12 grams (0.20 mole) of β-cyclopentylproprionyl chloride in 125 milliliters of anhydrous diethyl ether was cooled to ten degrees centigrade and mixed with 15.82 grams (0.20 mole) of pyridine. Then a solution of 27.62 grams (0.20 mole) of salicylic acid in 200 milliliters of anhydrous diethyl ether was added over a period of twenty minutes, with stirring, while holding the temperature of the reaction mixture at about ten degrees centigrade. The cooling bath was removed and the mixture stirred for ten hours. The mixture was allowed to stand overnight, and was then washed three times with fifty- milliliter portions of water. The organic layer was decanted and dried over anhydrous sodium sulfate. The resulting solution was concentrated to about 75–80 milliliters and refrigerated overnight at minus five degrees centigrade. The solid which separated from the solution was recovered by filtration, washed with a little cold diethyl ether and dried at 55 degrees centigrade in vacuo, to give 25.89 grams (49.5 percent) of salicylic acid β-cyclopentylpropionate; melting point 107–108 degrees centigrade.

By concentrating the filtrate, a second crop of the same compound weighing 7.32 grams (14.0 percent) and melting at 107.5–108.5 degrees centigrade was obtained.

Further concentration gave a third crop of the same compound weighing 2.46 grams (4.7 percent) and melting at 106.5–108 degrees centigrade.

For analytical purposes a sample of the first crop was recrystallized from diethyl ether. This material melted at 108.5–109 degrees centigrade and gave the following analysis:

*Analysis.*—Calculated for $C_{15}H_{18}O_4$: C, 68.68; H, 6.92. Found: C, 68.57; H, 6.60.

Having thus described my invention and the best manner known to me for carrying it out, it is to be understood that the invention is not limited in any of the particular details set forth and described, as obvious modifications and equivalents will be apparent to one skilled in the art, and the invention is therefore to be limited only by the scope of the appended claim.

I claim:
Salicylic acid β-cyclopentylpropionate.

References Cited in the file of this patent

UNITED STATES PATENTS 2,465,293    Stahmann et al. _____ Mar. 22, 1949

OTHER REFERENCES

Kaufmann: Chem. Abst., vol. 21, 1328 (1927).